March 2, 1926.

B. E. DAVIS 1,575,320

TRAFFIC SIGNAL FOR MOTOR VEHICLES

Filed Feb. 26, 1924  2 Sheets-Sheet 1

Inventor
Ben E. Davis
by Hazard and Miller
Att'ys

March 2, 1926.
B. E. DAVIS
TRAFFIC SIGNAL FOR MOTOR VEHICLES
Filed Feb. 26, 1921
1,575,320
2 Sheets-Sheet 2
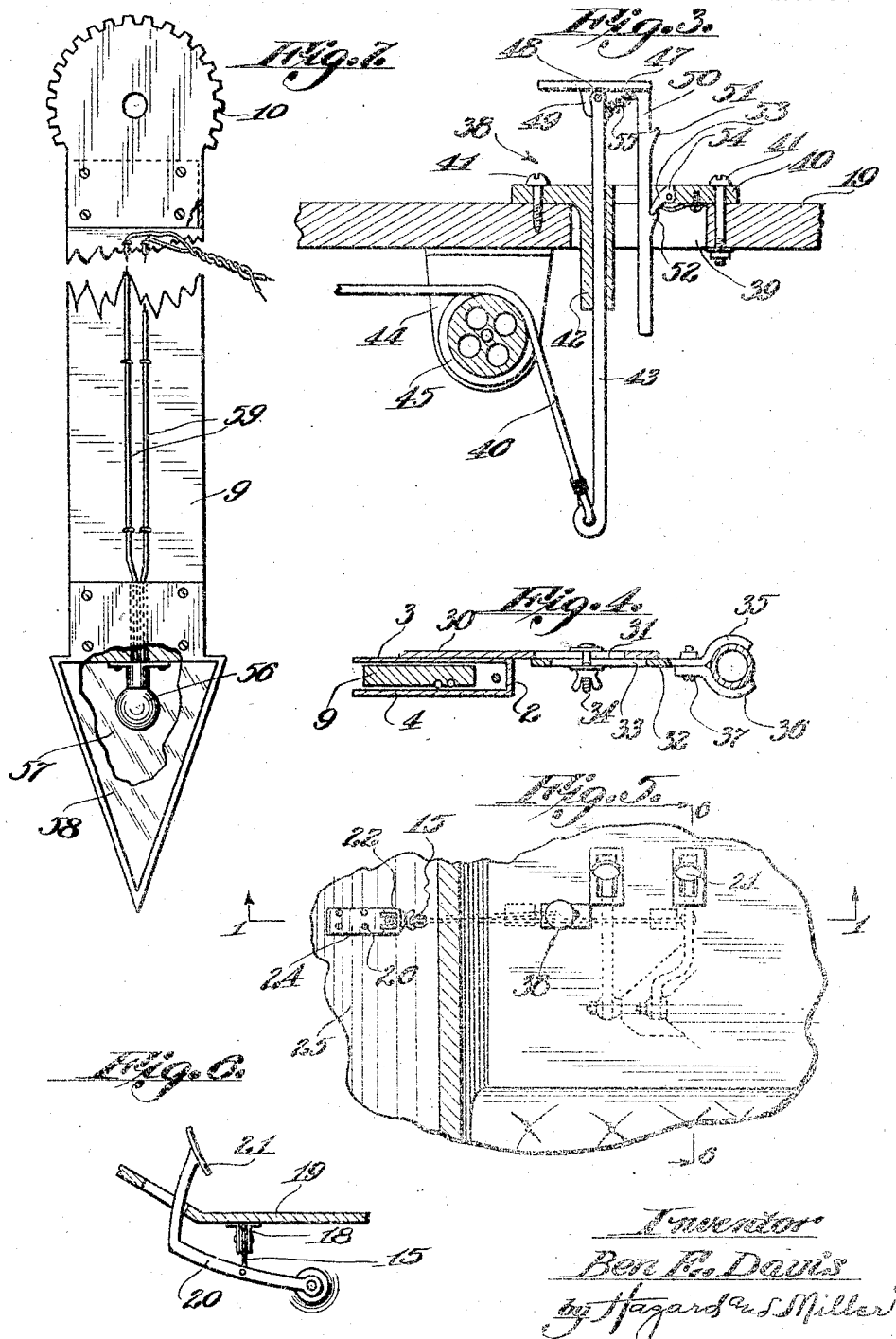
Inventor
Ben E. Davis
by Hazard and Miller
Attys Patented Mar. 2, 1926.

1,575,320

UNITED STATES PATENT OFFICE.

BEN E. DAVIS, OF LOS ANGELES, CALIFORNIA.

TRAFFIC SIGNAL FOR MOTOR VEHICLES.

Application filed February 26, 1924. Serial No. 695,301.

*To all whom it may concern:*

Be it known that I, BEN E. DAVIS, a citizen of the United States, residing at Los Angeles, in the county of Los Angeles and State of California, have invented new and useful Improvements in Traffic Signals for Motor Vehicles, of which the following is a specification.

My invention relates to traffic signals for motor vehicles and consists of the novel features herein shown, described and claimed.

An object of my invention is to make a traffic signal of the semaphore type which may be readily mounted upon a motor vehicle and operated by a pedal.

Other objects and advantages will appear from the drawings and specification.

The drawings illustrate the invention.

Fig. 3 is an enlarged fragmentary sectional detail on the same plane as Fig. 1 and showing the secondary pedal for operating the signal.

Fig. 4 is an enlarged horizontal sectional detail on the line 4—4 of Fig. 1.

Fig. 5 is a fragmentary horizontal section on the line 5—5 of Fig. 1.

Fig. 6 is a sectional detail on the line 6—6 of Figs. 1 and 5.

Fig. 7 is an enlarged fragmentary detail of the signaling arm, parts being broken away and shown in section.

Figure 1:
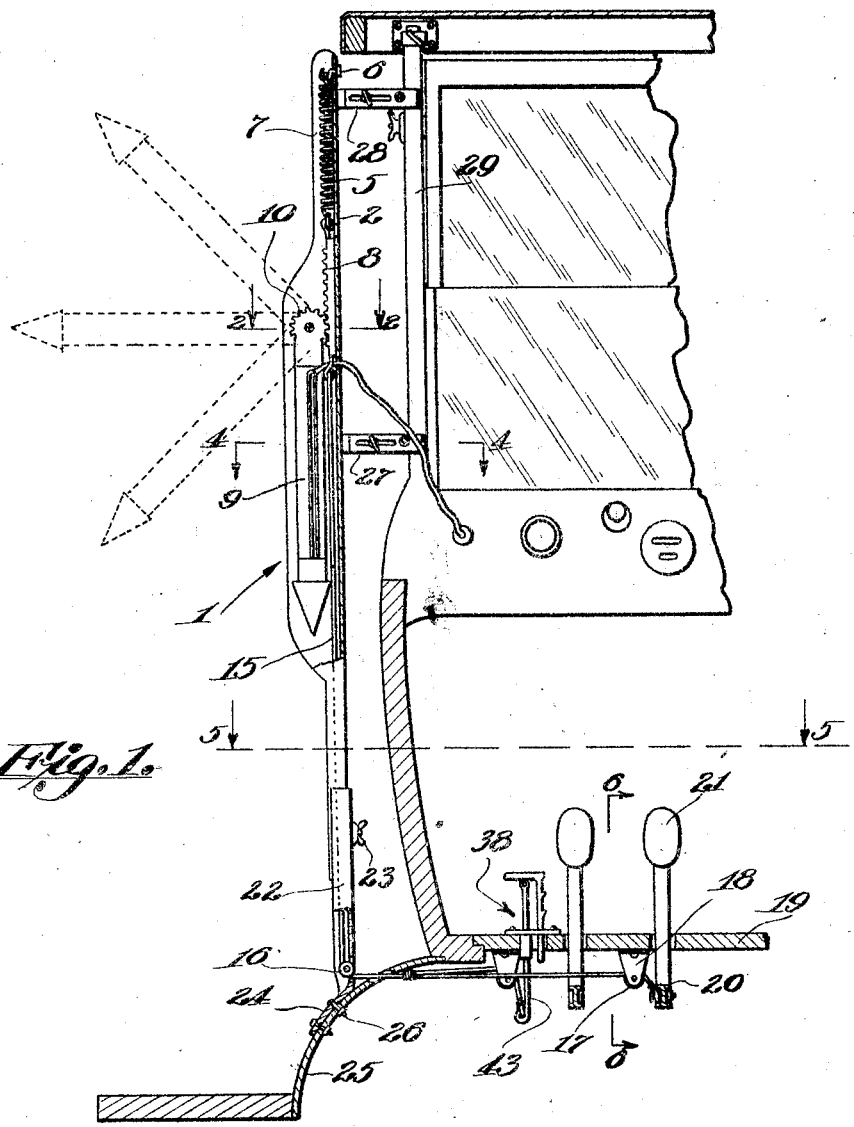
Figure 1 is a fragmentary vertical cross section of a motor vehicle on a line just back of the wind shield and instrument board and showing my traffic signal in position for use, parts being broken away and shown in section, the view being taken on the line 1—1 of Fig. 5 and looking in the direction indicated by the arrows, the operations being shown in dotted lines.
Figure 2:
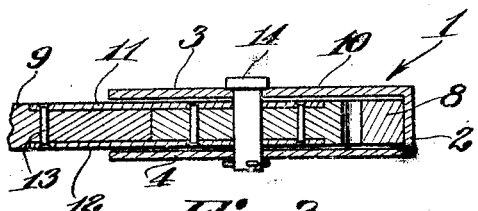
Fig. 2 is an enlarged horizontal cross section on the line 2—2 of Fig. 1.

The details of my traffic signal are as follows:

The main supporting frame 1 is channel shaped in cross section and has a straight back 2, a front side 3 and a rear side 4. The sides 3 and 4 are narrow at their upper and lower ends and wider at their central portions. An expansive coil spring 5 is connected to a hook 6 at the upper end of the frame 1 and operates in the channel 7 of the frame.

A gear rack 8 is connected to the lower end of the spring 5 and fits slidably between the sides 3 and 4 against the back 2. The signaling arm 9 is preferably formed of wood. A segmental gear 10 fits against the end of the arm 9 and is held in place by plates 11 and 12 recessed into the sides of the arm and the gear and connected by rivets 13. The gear 10 meshes with the rack 8 and a pivot pin 14 is inserted through the axial center of the gear 10 to support the swinging arm 9.

When the pedals are released the tension of the spring 5 pulls the rack 8 upwardly and the signaling arm 9 swings downwardly to a vertical position within the channel between the wide walls 3 and 4. A cord 15 is connected to the lower end of the rack 8 and extends downwardly in the channel and passes under a guide roller 16 at the extreme lower end of the channel and then over a guide roller 17 carried by a bracket 18 secured to the foot board 19 and the cord is attached to the arm 20 of the brake pedal 21 so that when the brake pedal is operated to set the brake the rack 8 is pulled downwardly far enough to swing the signaling arm 9 outwardly to an angle of 45 degrees as required to give the stop signal.

The lower end of the frame 1 has a telescoping section 22 sliding upon the main section and held adjustably in place by a thumb nut 23 so that the length of the frame may be adjusted by manipulating the thumb nut. A foot 24 extends from the lower end of the telescoping section 22 and is secured to the portion 25 of the automobile body by bolts 26. The adjustable braces 27 and 28 connect the upper part of the frame 1 to the wind shield frame 29. The brace 27 consists of a bar 30 welded or soldered to the front wall 3 and having an elongated slot 31 and the bar 32 having an elongated slot 33 fits against one side of the bar 30 and is held adjustably in position by the wing nut and bolt 34. The inner end of the bar 32 is bent to form a clamping member 35 to fit against one side of the frame 29 and a second clamping member 36 fits against the other side and the clamping member is operated by a bolt 37. The construction of the brace 28 is identical with the construction of the brace 27.

A secondary pedal construction 38 is mounted through the foot board 19 alongside of the regular pedals and the details of the secondary pedal are as follows:

An opening 39 is formed through the foot board 19, a base plate 40 fits upon the foot board 19 and is secured in place by bolts and screws 41. A bearing 42 extends downwardly from the plate 40 through the opening 39, a shaft 43 slidingly mounted through the bearing 42, a bracket 44 secured against the bottom of the foot board 19 and carrying a guide pulley 45 and a branch cord 46 is connected to the cord 15 and runs over the pulley 45 and is connected to the lower end of the shaft 43.

A foot plate 47 is connected to the upward end of the shaft 43 by a pivot 48 so as to rock to a limited extent in one direction and a stop 49 extends downwardly from the plate 47 to engage the shaft 43 to limit the rocking movement of the pedal to a horizontal position in one direction. The locking bar 50 is rigidly connected to the plate 47 and extends downwardly through the opening 39 and has teeth 51 and 52 projecting to the right as in Fig. 3.

A pawl 53 is pivotally mounted in the plate 40 to engage the teeth 51 and 52, there being a shoulder 54 upon the pawl 53 to limit this movement in one direction. An expansive coil spring 55 fits between the upper end of the shaft 43 and the upper end of the bar 50 the tension of the spring being exerted to hold the plate 47 level and hold the bar 50 swung outwardly to engage the pawl 53. When it is desired to release the signaling arm the operator places a foot upon the plate 47 and tilts the plate to compress the spring 55 and swing the bar 50 to move the teeth 51 or 52 out of engagement with the pawl 53. Then the tension of the spring 5 will pull the rack 8 to swing the signaling arm 9 into the housing, as shown in full lines in Fig. 1.

If it is desired to give the left signal the operator presses his foot upon the plate 47 to shove the bar 50 downwardly until the tooth 52 passes below the pawl 53 and then releases the plate 47 and the tension will hold the signaling arm 9 swung outwardly to a horizontal position, as shown in dotted lines in Fig. 1.

When it is desired to release the signal the plate 47 is tipped to unhook the bar 50 and allow the pedal to move upwardly.

When it is desired to show the right signal the plate 47 is pushed downwardly until the hook 51 engages the pawl 53 and then the signaling arm is swung outwardly and upwardly to the upper inclined position shown by the dotted lines in Fig. 1.

When it is desired to release the right signal the plate 47 is again kicked to unhook the bar 50 and tooth 51 from the pawl 53.

A V-shaped frame 55 is secured to the outer end of the signaling arm 9, a lamp 56 is secured against the end face of the arm 9 within the frame 55, and transparent plates 57 and 58 are secured in the frame 55 in front of and behind the lamp 56. Electric cords 59 connect the lamp 56 to the electric system of the automobile.

Thus I have produced a traffic signal for motor vehicles, comprising a channel shaped frame adapted for attachment at the side of a vehicle and forming a housing, a signaling arm pivotally mounted to swing into and out of the housing, a gear rack slidingly mounted in the housing and spring pressed upwardly, a gear upon the arm and meshing with the rack, a cord connected to the rack and adapted to be connected to a brake pedal, a secondary pedal connected to the cord and adapted to be mounted upon a foot board beside the regular pedals, and locks for holding the secondary pedal, so that when the brake pedal is operated the arm will show the stop signal, and so that when the secondary pedal is operated one way the arm will show the left signal and so that when the secondary pedal is operated another way the arm will show the right signal.

The signals will remain in their respective indicating positions until deliberately released and even in case of serious injury to the car and the fracture of the indicating arm the position of the secondary pedal or the brake pedal will furnish evidence that the signal had been properly operated by the driver to give the required warning.

Various changes may be made without departing from the spirit of my invention as claimed.

I claim:

A vehicle signal comprising an open sided housing, a rack slidable in said housing, a coil spring disposed within said housing having one end secured to the housing and the other end secured to the upper end of the rack, a gear pivoted in the housing and meshing with said rack, a semaphore arm rigid with said gear, and means for moving said rack against the action of said spring whereby the semaphore arm may be swung outwardly and upwardly through the open side of the housing into either of a plurality of signaling positions.

In testimony whereof I have signed my name to this specification.

BEN E. DAVIS.